(12) United States Patent
Yu et al.

(10) Patent No.: US 9,988,983 B2
(45) Date of Patent: Jun. 5, 2018

(54) POWER GENERATION SYSTEM FOR USING SYNGAS GENERATED IN GASIFIER TO PRODUCE ELECTRICITY

(71) Applicant: General Electric Company, Schenectady, NY (US)

(72) Inventors: Ping Yu, Shanghai (CN); Lishun Hu, Shanghai (CN)

(73) Assignee: General Electric Company, Schenectady, NY (US)

( * ) Notice: Subject to any disclaimer, the term of this patent is extended or adjusted under 35 U.S.C. 154(b) by 421 days.

(21) Appl. No.: 14/593,083

(22) Filed: Jan. 9, 2015

(65) Prior Publication Data

US 2015/0198088 A1   Jul. 16, 2015

(30) Foreign Application Priority Data

Jan. 10, 2014   (CN) ..................... 2014 2 0016637 U

(51) Int. Cl.
*F02C 3/28*   (2006.01)
*F01K 23/10*   (2006.01)
*F02C 7/14*   (2006.01)

(52) U.S. Cl.
CPC ............... *F02C 3/28* (2013.01); *F01K 23/10* (2013.01); *F02C 7/14* (2013.01); *F05D 2220/32* (2013.01); *F05D 2220/722* (2013.01); *Y02E 20/16* (2013.01); *Y02E 20/18* (2013.01)

(58) Field of Classification Search
CPC .... F02C 3/25; F02C 7/14; F01K 23/10; F01K 23/067; F05D 2220/722; F05D 2220/32; Y02E 20/18; Y02E 20/184; B01D 53/14; B01D 53/1406; B01D 53/1456; B01D 53/18; B01D 50/006; B01D 47/00; B01D 47/022; C10J 2300/1603; C10K 1/00; C10K 1/003; C10K 1/08; C10K 1/024

See application file for complete search history.

(56) References Cited

U.S. PATENT DOCUMENTS 6,167,692 B1 * 1/2001 Anand ...................... F02C 1/00
 60/39.12
7,056,487 B2 * 6/2006 Newby .................. B01D 53/10
 422/170

(Continued)

*Primary Examiner* — Ehud Gartenberg
*Assistant Examiner* — Jason H Duger
(74) *Attorney, Agent, or Firm* — GE Global Patent Operation; Catherine Winter

(57) ABSTRACT

A power generation system including a gasifier for receiving and converting coal-water slurry to a fuel stream, and a quench device for cooling the fuel stream to generate a cooled down fuel stream. The quench device includes a water quench ring, which is able to spray water to cool the fuel stream passing therethrough. The system further includes a separating device, which includes a separator and a high temperature filter for removing rough and fine particles from the cooled down fuel stream respectively, an expander for receiving and utilizing energy in the fuel stream with solids removed to generate power, during which temperature and pressure of the fuel stream drop and an expanded fuel stream is generated, an acid gas removal unit for removing acid gases from the expanded fuel stream, and a gas turbine combine cycle for generating power from the fuel stream with acid gases removed.

3 Claims, 1 Drawing Sheet

(56) References Cited

U.S. PATENT DOCUMENTS

| | | | | |
|---|---|---|---|---|
| 7,856,829 B2* | 12/2010 | Shah | ..................... | B01D 53/75 60/780 |
| 8,241,523 B2* | 8/2012 | Apanel | ................. | B01J 8/0055 252/373 |
| 8,268,266 B2* | 9/2012 | Ghosh | ..................... | C01B 3/50 422/129 |
| 8,354,082 B2* | 1/2013 | Frydman | ................... | C10J 3/86 422/630 |
| 8,821,598 B2* | 9/2014 | Dinu | ....................... | C10J 3/845 48/61 |
| 2009/0158701 A1 | 6/2009 | Hoffmann et al. | | |
| 2011/0016788 A1* | 1/2011 | Thacker | ................ | F01K 23/067 48/76 |
| 2012/0198768 A1* | 8/2012 | Khosravian | ............. | C10J 3/466 48/61 |

\* cited by examiner

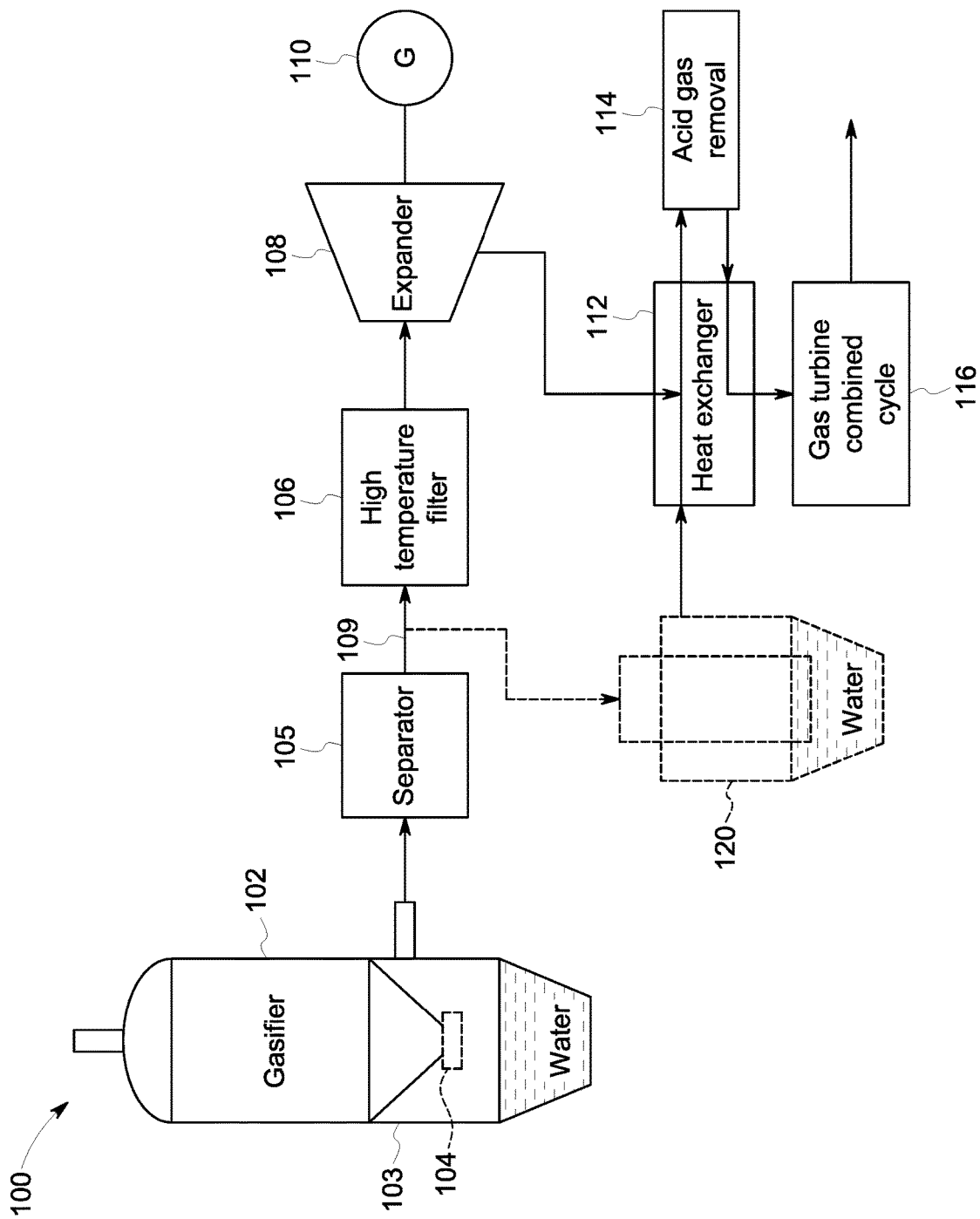

POWER GENERATION SYSTEM FOR USING SYNGAS GENERATED IN GASIFIER TO PRODUCE ELECTRICITY

BACKGROUND

Embodiments of the present invention relate generally to a power generation system, and more specifically, to a power generation system for using syngas generated in a gasifier to produce electricity.

An integrated gasification combined cycle (IGCC) power generation system is an advanced power generation system which integrates coal gasification technology with a high-efficiency combine cycle power generation system. A typical IGCC process mainly includes gasifying coal into medium-low heat value gas, and removing dust and sulphide in the gas to produce clean fuel gas (syngas). The clean fuel gas is then fed into a combustor of a gas turbine and burned to heat the working gas so as to drive the gas turbine to work. The exhaust of the gas turbine is used to heat the feedwater of a waste heat boiler to produce over-heating stream to drive a stream turbine to work. The IGCC power generation system basically includes parts for coal preparation, coal gasification, gas purification, and heat recovery, respectively, as well as gas turbine and steam turbine generators. High-efficiency heat recovery has important significance for the IGCC power generation system. If the energy of the high pressure and temperature gas cannot be properly reclaimed and utilized, not only the energy efficiency and the cost of the power generation system but also the environment are affected.

Currently, there are mainly two kinds of available heat recovery processes for IGCC power generation system. As for the gasification processes using dry pulverized coal as the material, usually a radiation refrigerator is used to cycle back the cold syngas in the system to quench the high temperature gas from the gasifier and reclaim the heat of the high temperature gas to produce the steam used in the steam generator. As for the gasification processes using coal-water slurry as the material, usually the high temperature gas from the gasifier is directly subjected to quench cooling and cleaning, and then fed into a gas turbine to generate power. The first processes are relatively higher in cost. The second processes are relatively lower in cost and simple in operation. However, the energy recovery efficiency of the second processes is pretty low and a great deal of energy is wasted.

Therefore, there is a need for a higher-efficiency approach for reclaiming and utilizing the energy in the IGCC power generation system.

BRIEF DESCRIPTION

Embodiments of the present invention relate to a power generation system. The power generation system includes a gasifier for receiving coal-water slurry and converting the coal-water slurry to a high pressure and temperature fuel stream, and a quench device for cooling the high pressure and temperature fuel stream from the gasifier to generate a cooled down fuel stream. The quench device includes a water quench ring, which allows the high pressure and temperature fuel stream to pass through and is able to spray water to cool the fuel stream passing through it. The system further includes a separating device, which includes a separator and a high temperature filter for removing rough and fine particles from the cooled down fuel stream, respectively, so as to generate a fuel stream with solids removed, an expander for receiving the fuel stream with solids removed and utilizing energy in the fuel stream to generate power, during which temperature and pressure of the fuel stream drop and an expanded fuel stream is generated, an acid gas removal unit for removing acid gases from the expanded fuel stream, and a gas turbine combine cycle for generating power from the fuel stream with acid gases removed.

BRIEF DESCRIPTION OF THE DRAWINGS

The above and other aspects, features, and advantages of the present disclosure will become more apparent in light of the following detailed description when taken in conjunction with the accompanying drawings in which:

FIG. 1 illustrates a power generation system utilizing syngas from a gasifier to generate power, in accordance with an embodiment of the present invention.

DETAILED DESCRIPTION OF THE DISCLOSURE

Detailed description of the present invention will be illustrated herein below. Unless defined otherwise, technical and scientific terms used herein have the same meaning as is commonly understood by one of ordinary skill in the art to which this disclosure belongs.

The term "a" or "an" "one" does not denote a limitation of quantity, but rather denote the presence of at least one of the referenced items. Approximating language, as used herein throughout the specification and claims, may be applied to modify any quantitative representation that could permissibly vary without resulting in a change in the basic function to which it is related. Accordingly, a value modified by a term or terms, such as "about" is not to be limited to the precise value specified. In some embodiments, "about" denote allowing the value modified in the range of plus or minus 10 percentages, like "about 100" denotes it can be any value between 90 and 100. Besides, in the term "about the first value to the second value", the "about" modify both the first and second value. In some instances, the approximating language may correspond to the precision of an instrument for measuring the value.

Embodiments of the present invention relate generally to power generation systems utilizing syngas produced in a coal gasifier, like Integrated Gasification Combined Cycle (IGCC) power generation systems. In the systems, the residual heat and pressure of the syngas are used in an expander for generating power before the syngas is used for generating power in a gas turbine system. In some embodiments, the power generation system includes a gasifier, a quench device, a separating device, an expander, an acid gas removal unit and a gas turbine combine cycle. The gasifier is used for receiving coal-water slurry and converting it to a high pressure and temperature fuel stream. The quench device is used for cooling the high pressure and temperature fuel stream from the gasifier to generate a cooled down fuel stream. The separating device is used for removing solids from the cooled down fuel stream and generating a fuel stream with a small quality of solids. The expander is used for receiving the fuel stream with a small quality of solids and utilizing energy in the fuel stream to generate power, during which an expanded fuel stream is generated. The acid gas removal unit is used for removing acid gases from the expanded fuel stream. The gas turbine combine cycle is used for generating power from the fuel stream with acid gases removed.

Referring to FIG. 1, in a specific embodiment, a power generation system 100 includes a gasifier 102 using coal-water slurry as material for generating syngas. The coal-water slurry is fed to the gasifier 102 by a high-pressure pump, and therefore the pressure inside the gasifier 102 is high. Moreover, the temperature inside the gasifier 102 is high as well. The fuel gas produced in the gasifier 102 is a high temperature and pressure syngas with a temperature higher than about 900° C. and a pressure higher than about 4 MPa. For instance, in some specific embodiments, the pressure of the syngas is higher than about 4.5 MPa, or preferably from about 4.5 MPa to about 50 MPa, and the temperature is higher than about 950° C., or preferably higher than about 1000° C., like about 1300° C. or higher. The power generation system 100 further includes a quench device 103 for cooling the high temperature and pressure syngas produced in the gasifier 102 by water quench. The quench device 103 is able to cool down the syngas to a tolerable temperature of downstream equipment (like the expander). In the illustrated embodiment, the quench device 103 is located below the gasifier 102 and includes a water quench ring 104, which allows the syngas flowing down from the gasifier 102 to pass through and is able to spray water to cool the high temperature and pressure syngas passing therethrough. The quench device 103 is loaded with water at its bottom, and at least some solids are deposited to the bottom of the quench device 103 during the cooling process of the syngas.

The syngas output from the gasifier 102 and cooled by the quench device 103 has a temperature of about 400° C. or in some particular embodiments of about 450° C. or higher, and a pressure of about 9 MPa or higher, both of which are higher than the downstream load demand. Therefore, an energy recovery system is used to reclaim and utilize the residual heat and pressure in the syngas before the syngas enters a gas turbine combine cycle to generate power. The energy recovery system is combined with the gas turbine combine cycle to achieve optimized energy recovery and utilization efficiency. In the illustrated embodiment, a separating device and an expander 108 are coupled downstream of the quench device 103, such that the cooled down syngas from the quench device 103 is allowed to enter the separating device to remove solids and then enter the expander 108 to generate power. The separating device includes a separator (like cyclone separator) 105 and a high temperature filter 106, which are used for removing rough and fine particles from the syngas, respectively. The high temperature filter is able to remove fine particles from the syngas at a temperature above 250° C., or preferably above 350° C., or more preferably above 450° C., like 600° C. or even higher. In a specific embodiment, the high temperature filter is a ceramic filter, which is able to remove fine particles from the syngas at the temperature of 600° C. or higher. In the expander 108, the syngas expands to do work, which is converted into kinetic energy that drives a working wheel to rotate to drive a joint power generator 110 to generate power. The temperature and pressure of the syngas decrease during the process of doing work.

The syngas output from the expander 108, which has done the work, enters a heat-exchanger 112 for being further cooled down and then enters an acid gas removal unit 114 for acid gas (like sulfurated hydrogen) removal. The heat-exchanger 112 is connected between the expander 108 and the acid gas removal unit 114 and enables therein heat exchange between the syngas flowing therethrough from the expander 108 to the acid gas removal unit 114 for acid gas removal and the syngas with acid gases removed flowing from the acid gas removal unit 114 to a gas turbine combine cycle 116 for generating power. Heat exchange occurs between the two streams of syngas that flow through the heat-exchanger 112 in a direction opposite to that of the expanded fuel stream, which not only effectively cools down the syngas but also reasonably utilizes the heat of the syngas.

In one embodiment, there is a switching device 109 between the separator 105 and the high temperature filter 106, for selectively connecting the separator 105 to the high temperature filter 106, or an emergency quench tank 120, which is coupled upstream of the acid gas removal unit 114, or preferably is coupled upstream of the heat-exchanger 112 mounted at an upstream of the acid gas removal unit 114. Once the high temperature filter 106 fails, by operating the switching device 109, the separator 105 is coupled to the emergency quench tank 120, which allows the flue stream from the separator 105 to be cooled therein before entering the acid gas removal unit 114. The emergency quench tank 120 includes a down pipe, a residual cake valve and water for cooling the syngas, and is thermally coupled to the heat-exchanger 112 for cooling down the syngas at the upstream of the heat-exchanger 112. Therefore, even if the high temperature filter 106 fails, which leads to a situation that high temperature syngas does not flow through and do work in the expander 108, the syngas still can be cooled down to a suitable temperature without damaging the heat-exchanger 112 and the acid removal unit 114 at a downstream thereof.

In the power generation systems as described above, the syngas is partially cooled by water quench to a temperature tolerable by downstream equipment. For example, syngas may be partially cooled down from about 1300° C. to about 400° C. through water quench. But the syngas may be still too hot. Then the syngas flows through the separator and the high temperature filter where solids in the syngas are removed, and further enters the expander to do work to generate power, during which both the temperature and pressure of the syngas drop. Such power generation systems make full use of the pressure of the syngas, and are more efficient at generating electricity compared with radiation refrigerators due to their ability to transfer more energy of syngas into electric energy. As such, the power generation systems as described above are especially fit for the syngas produced in high pressure gasification processes, and the higher pressure of the syngas produced in the gasification process, the more the power generation systems have the advantages.

The present invention may be embodied in other specific forms without deviating from the spirit or essential characteristics thereof. Accordingly, the disclosures and descriptions herein are intended to be illustrative, but not limiting, of the scope of the present invention, which is set forth in the following claims. Therefore, further modifications and equivalents of the disclosure herein disclosed are believed to be within the spirit and scope of the disclosure as defined by the following claims.

What is claimed is:

1. A power generation system comprising:
   a gasifier configured to receive coal-water slurry and convert the coal-water slurry to a high pressure and temperature fuel stream;
   a quench device comprising a water quench ring, the water quench ring configured to pass the high pressure and temperature fuel stream therethrough and to spray cooling water into the high pressure and temperature fuel stream passing therethrough so as to generate a cooled down fuel stream;

a separator configured to remove rough particles from the cooled down fuel stream so as to generate a separated flue stream;

a switching device configured to selectively direct the separated flue stream from the separator to one of a first branch having a high temperature filter and a second branch having an emergency quench tank, the high temperature filter configured to receive the separated flue stream and remove fine particles therefrom so as to generate a fuel stream with solids removed, the emergency quench tank configured to receive and cool the separated flue stream so as to generate a filter bypass stream;

an expander positioned in the first branch, the expander configured to receive and expand the fuel stream with solids removed to generate power, the expander decreasing temperature and pressure of the fuel stream with solids removed so as to generate an expanded fuel stream;

a heat exchanger configured to exchange heat between a first stream entering the heat exchanger and a second stream exiting the heat exchanger, wherein the heat exchanger is located downstream from the expander and the emergency quench tank and the first stream is one of the expanded fuel stream and the filter bypass stream;

an acid gas removal unit configured to remove acid gases from the first stream so as to generate the second stream;

wherein the switching device is coupled between the separator and the high temperature filter, wherein when the switching device is configured to selectively direct the separated flue stream to the first branch, the first stream is the expanded fuel stream, and when the switching device is configured to selectively direct the separated flue stream to the second branch, the first stream is the filter bypass stream, wherein the emergency quench tank is configured to cool the separated flue stream upstream of the heat exchanger and the acid gas removal unit; and a gas turbine combine cycle configured to generate power from the second stream.

2. The system according to claim 1, wherein the high temperature filter is capapble of removing fine particles from the separated flue stream at a temperature of about 450° C. or higher.

3. The system according to claim 1, wherein the high temperature filter is capapble of removing fine particles from the separated flue stream at a temperature of about 600° C. or higher.

* * * * *